United States Patent
Murphy et al.

(10) Patent No.: US 6,282,362 B1
(45) Date of Patent: Aug. 28, 2001

(54) GEOGRAPHICAL POSITION/IMAGE DIGITAL RECORDING AND DISPLAY SYSTEM

(75) Inventors: Michael Murphy, San Jose; Arthur N. Woo, Cupertino, both of CA (US); Mark Nichols, Oakwood, OH (US); John Schipper, Palo Alto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 08/949,510

(22) Filed: Oct. 10, 1997

Related U.S. Application Data

(63) Continuation of application No. 08/554,822, filed on Nov. 7, 1995, now abandoned.

(51) Int. Cl.[7] .............................. H04N 5/76; H04N 5/225
(52) U.S. Cl. ..................... 386/46; 386/117; 358/909.1; 348/232
(58) Field of Search ................................. 358/310, 335, 358/906, 909, 103, 108, 109, 209, 909.1; 360/33.1; 354/105, 109, 75, 76; 348/232; 386/46, 95, 117; H04N 5/76, 5/225, 9/79

(56) References Cited

U.S. PATENT DOCUMENTS

| 3,798,360 | 3/1974 | Feistel . |
| 3,872,483 | 3/1975 | Numata et al. . |

(List continued on next page.)

FOREIGN PATENT DOCUMENTS

| 9521386 | 8/1995 | (WO) . |

OTHER PUBLICATIONS

S. Walton, "Image Authentication for a Slippery New Age", Dr. Dobb's Journal, Apr. 1995, pp. 18–26.

(List continued on next page.)

*Primary Examiner*—Thai Tran
(74) *Attorney, Agent, or Firm*—Blakely, Sokoloff, Taylor & Zafman

(57) ABSTRACT

A geographical position/image capturing system stores object images and position coordinates as digital data. The system incorporates a geo-addressed map data base and geo-positioning device for relating the position of the system at the time the image is captured to the captured digital image data and the geo-addressed map. A point-of-interest feature data base is linked to the image data and the position data, by hyper-media links. Digital multi-media entities such as graphics, video clips, audio streams and the like can be digitally stored and retrieved based on hyper-media links coupling the entities to the object images, the map position and feature data base. A playback unit incorporating an image viewer communicates with the stored digital digital image data, the multi-media entities, the map data base, and the feature data base and allows modified images of selected portions of the images and other data to be viewed by a user. An audio reproduction device may be included to reproduce the audio media entities when they are selected by the appropriate hyper-media link. In one embodiment of the system, the image capturing function and the geo-positioning function are physically remote from the viewing function until the captured data is transferred to the retrieval and playback unit. In another embodiment, the capture functions and playback functions are combined in a compact, hand-held, portable unit for consumer or industrial field use. The images, position data and multi-media entities may be stored as a single, compressed, linked digital data file. The data file is provided with hyper-media connections between the various entities, which connections are actuated by clicking on icons displayed on the viewer, or by actuating buttons or switches provided on the system console. Angular orientation determining device for providing angular orientation data may also be incorporated such that the system angular orientation at the time of image capture may be captured and stored for subsequent retrieval and display.

18 Claims, 7 Drawing Sheets

U.S. PATENT DOCUMENTS

| | | |
|---|---|---|
| 3,882,512 | 5/1975 | Lawrence et al. . |
| 3,906,523 | 9/1975 | Ogiso et al. ............................ 354/109 |
| 3,968,505 | 7/1976 | Kauneckas . |
| 4,053,240 | 10/1977 | Aizawa et al. . |
| 4,064,515 | 12/1977 | Mashimo et al. . |
| 4,074,324 | 2/1978 | Barrett . |
| 4,122,521 | 10/1978 | Rick et al. . |
| 4,131,919 | 12/1978 | Lloyd et al. . |
| 4,149,795 | 4/1979 | Sakurada et al. . |
| 4,175,848 | 11/1979 | Murakami et al. . |
| 4,361,388 | 11/1982 | Micak et al. . |
| 4,405,829 | 9/1983 | Rivest et al. . |
| 4,418,425 | 11/1983 | Fennel . |
| 4,489,351 | 12/1984 | de Costamore d'Arc . |
| 4,541,010 | 9/1985 | Alston . |
| 4,626,898 | 12/1986 | Baba et al. . |
| 4,635,203 | 1/1987 | Merchant . |
| 4,680,628 | 7/1987 | Wojcik et al. . |
| 4,695,959 | 9/1987 | Lees et al. . |
| 4,702,585 | 10/1987 | Harada et al. . |
| 4,704,632 | 11/1987 | Van Den Heuvel . |
| 4,705,372 | 11/1987 | Lapeyre ................................ 354/106 |
| 4,709,266 | 11/1987 | Hanas et al. . |
| 4,754,280 | 6/1988 | Brown et al. ......................... 342/357 |
| 4,791,589 | 12/1988 | Blazo et al. . |
| 4,792,904 | 12/1988 | Reinagel et al. ....................... 364/429 |
| 4,792,907 | 12/1988 | Ikeda et al. ............................ 364/449 |
| 4,814,711 | 3/1989 | Olsen et al. ............................ 324/331 |
| 4,837,628 | 6/1989 | Sasaki . |
| 4,860,352 | 8/1989 | Laurance et al. . |
| 4,864,616 | 9/1989 | Pond et al. . |
| 4,887,296 | 12/1989 | Horne . |
| 4,916,737 | 4/1990 | Chormet et al. . |
| 4,930,014 | 5/1990 | Maeda et al. ......................... 358/209 |
| 4,949,089 | 8/1990 | Ruszkowski .......................... 342/52 |
| 4,972,254 | 11/1990 | Endo et al. .............................. 358/44 |
| 4,993,067 | 2/1991 | Leopold . |
| 5,036,344 | 7/1991 | Inoue et al. ........................... 354/106 |
| 5,040,068 | 8/1991 | Parulski et al. ....................... 358/209 |
| 5,045,937 | 9/1991 | Myrick . |
| 5,072,396 | 12/1991 | Fitzpatrick et al. ................. 364/450 |
| 5,115,467 | 5/1992 | Esserman et al. . |
| 5,155,774 | 10/1992 | Numagami ............................... 382/1 |
| 5,166,789 | 11/1992 | Myrick ................................ 358/109 |
| 5,191,613 | 3/1993 | Graziano et al. . |
| 5,221,925 | 6/1993 | Cross . |
| 5,237,612 | 8/1993 | Raith . |
| 5,243,652 | 9/1993 | Teare et al. . |
| 5,247,575 | 9/1993 | Sprague et al. . |
| 5,267,042 | 11/1993 | Tsuchiya et al. .................... 358/209 |
| 5,296,884 | 3/1994 | Honda et al. . |
| 5,321,753 | 6/1994 | Gritton . |
| 5,343,529 | 8/1994 | Goldfine et al. . |
| 5,347,580 | 9/1994 | Molva et al. . |
| 5,349,459 | 9/1994 | Reed . |
| 5,363,448 | 11/1994 | Koopman, Jr. et al. . |
| 5,379,224 | 1/1995 | Brown et al. . |
| 5,382,957 | 1/1995 | Blume . |
| 5,384,846 | 1/1995 | Berson et al. . |
| 5,386,117 | 1/1995 | Piety et al. . |
| 5,388,158 | 2/1995 | Berson . |
| 5,390,245 | 2/1995 | Dent et al. . |
| 5,390,297 | 2/1995 | Barber et al. . |
| 5,406,619 | 4/1995 | Akhterruzzaman . |
| 5,408,217 | 4/1995 | Sanderford, Jr. . |
| 5,414,462 | 5/1995 | Veatch .................................. 348/165 |
| 5,422,814 | 6/1995 | Sprague et al. ....................... 364/449 |
| 5,440,301 | 8/1995 | Evans . |
| 5,442,342 | 8/1995 | Kung . |
| 5,450,344 | 9/1995 | Woo et al. ............................ 364/449 |
| 5,451,757 | 9/1995 | Heath, Jr. . |
| 5,471,392 * | 11/1995 | Yamashita ............................ 364/443 |
| 5,499,294 | 3/1996 | Friedman . |
| 5,506,644 | 4/1996 | Suzuki et al. . |
| 5,508,736 | 4/1996 | Cooper . |
| 5,521,587 | 5/1996 | Loomis et al. . |
| 5,526,291 | 6/1996 | Lennen . |
| 5,530,759 | 6/1996 | Braudaway et al. . |
| 5,535,011 * | 7/1996 | Yamagami et al. ............... 358/909.1 |
| 5,541,845 | 7/1996 | Klein . |
| 5,559,707 * | 9/1996 | Delorme et al. ..................... 364/443 |
| 5,768,380 * | 6/1998 | Rosauer et al. ....................... 380/21 |

OTHER PUBLICATIONS

GPS Interface Control Document ICD–GPS–200, Rockwell Intl. Corp., Satellite Systems Div., Rev. B–PR, Jul. 3, 1991.

*Encyclopedia of Computer Science,* "Cross–Assemblers and Compilers", 3rd Edition, Anthony Ralston and Edwin D. Reilly, Van Nostrand Reinhold, NY, NY, 1993, pp. 369–370.

*Electronics Engineers Handbook,* Donald G. Fink and Donald Christiansen, 3rd Edition, McGraw Hill, NY, NY, 1989, pp. 19–85 to 19–94.

* cited by examiner

FIG. 1 EXAMPLE GENERIC SYSTEM

FIG. 2 HIGHLY INTEGRATED PORTABLE SYSTEM

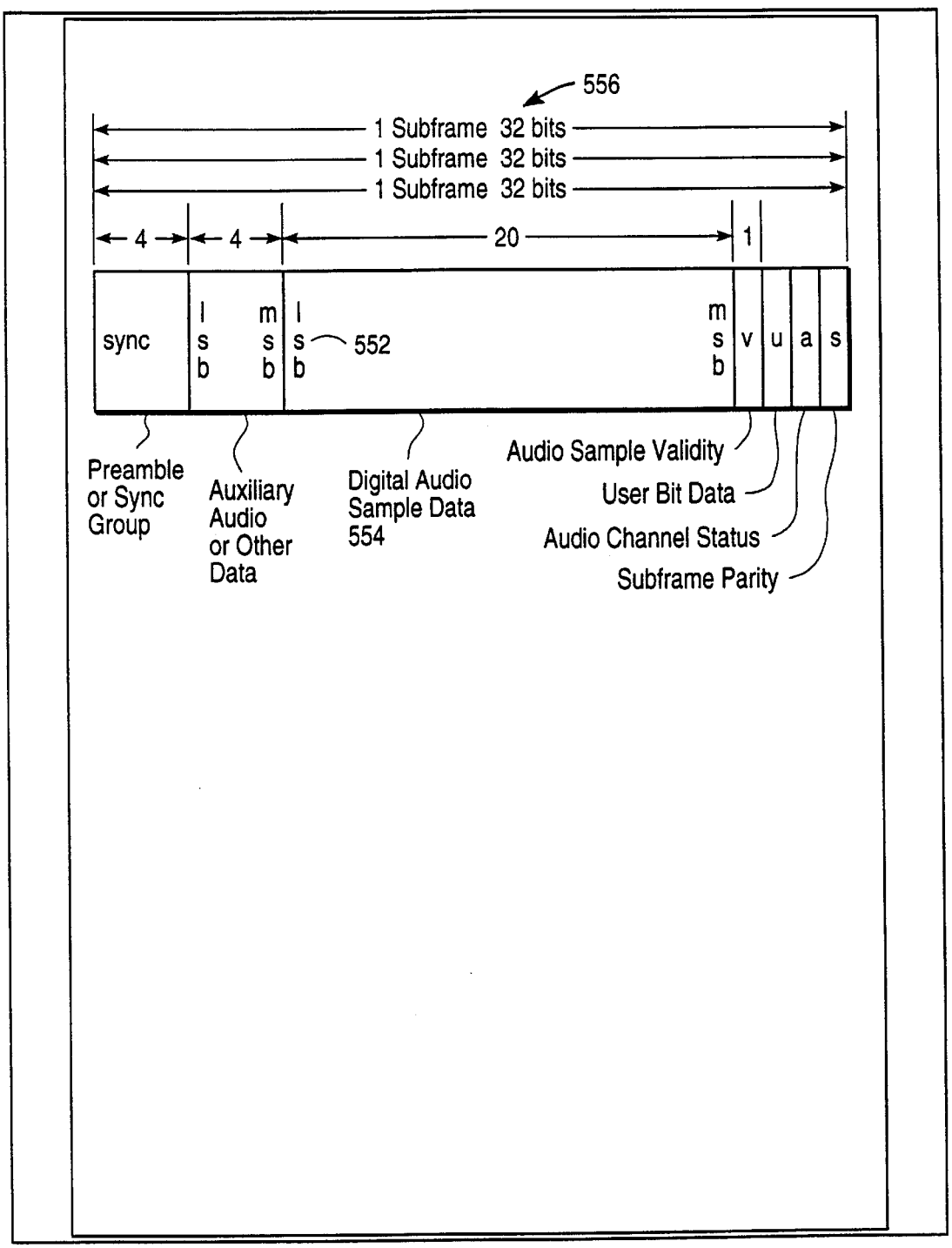
FIG. 10 DIGITAL AUDIO TAPE FORMAT

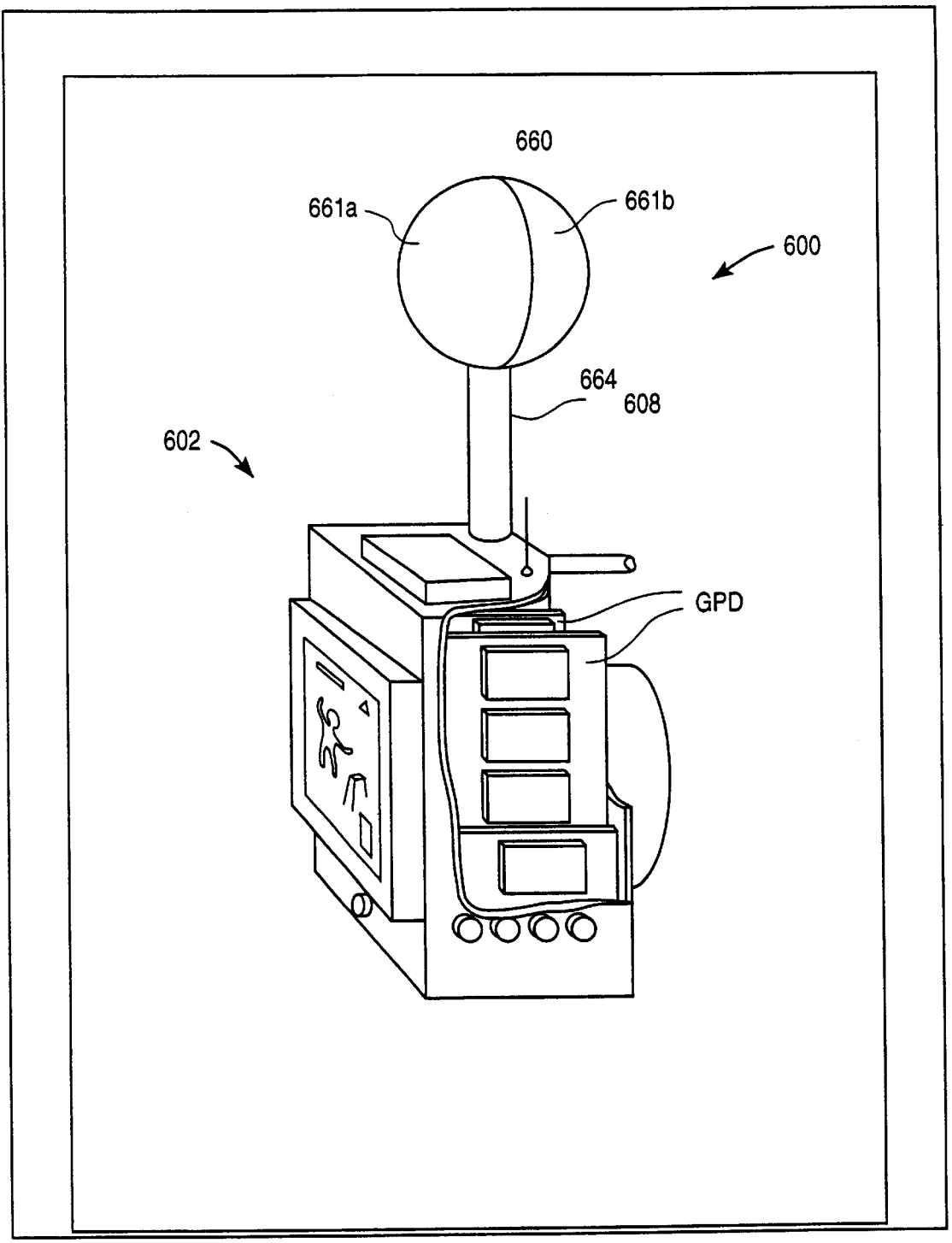
FIG. 11  FISH-EYE LENS EMBODIMENT

GEOGRAPHICAL POSITION/IMAGE DIGITAL RECORDING AND DISPLAY SYSTEM

This is a continuation of application Ser. No. 08/554,822, filed Nov. 7, 1995, now abandoned.

BACKGROUND OF THE INVENTION

1. Field of the Invention

The invention relates to a method and system for capturing, storing and retrieving digital image data and one or more multi-media digital data entities by means related to the geographical location at which the images were captured. More particularly the invention has embodiments which include hyper-links between the recorded image data and stored digital multi-media data entities in which at least a portion of the entities are stored in a compressed Portable Document Format (PDF). Encryption of the digital data as recorded may also be performed using the geographical position data as at least part of an encryption/decryption key to provide secure authentication of recorded data to a second party.

2. Previous Art

Many applications of image or picture recording associated with the recording location are known. Tsuchiya, U.S. Pat. No. 5,267,042 shows a image pickup device body having a position detection means to record the device body position and an object image at the same time onto the image recording medium. Tsuchiya discloses a recording medium as photosensitive film or a magnetic video tape recorder. Location data is captured on the same film or video image as geographical coordinates, or alternately is captured on an sequential or parallel associated image. Means are provided for converting the digital coordinate data to an appropriate image for recording on film or with the video signal. It would be an advantage to eliminate the conversion step from digital coordinate data to an image of the coordinates.

Tsuchiya also discloses generating signals from an azimuth sensor and subsequently carrying out A/D conversion of the azimuth sensor signals. The converted azimuth sensor signals are coupled to a photosensitive unit which records the azimuth along with the image on the photosensitive film. It would be an advantage to directly store the image and coordinate data in a digital format, thereby eliminating extra conversion steps.

In Honda, U.S. Pat. No. 5,296,884, there is disclosed a data recording camera which automatically records an object image along with data relating to place at every photo operation. Place names and other data related to place are recorded along with image data, at the time of recording the image, on an IC card, magnetic disk or optical disk by means of a location determining device, such as a GPS receiver.

The camera operator selects one or more place data from a predetermined place data list or storage device incorporated in the camera. The operator selects the desired place data by means of a plurality of switches. The selected place data, such as a place name, eg Los Angeles, is recorded along with the object image. The place data is either imposed on the image data or is included as another display element. The additional display element may include the place data as letter images or codes.

It would be an advantage to automatically select the place data as a function of the camera location, thereby saving the operator time and effort of multiple switch manipulations.

Honda also discloses searching of images based on recorded place data, by reproducing the recorded place data and/or date and time data and searching for a comparison with a predetermined criteria. When a match is found, the selected image, corresponding to the selected place and/or time and date data, is reproduced and displayed. It would be more convenient to minimize the delay caused by reproducing and searching and comparing a long sequence of place or date/time images, in order to select one or more recorded object images.

Gunthorpe, et al, in patent application PCT/AU92/00667, disclose a portable distance calculator method and apparatus. The distance calculator apparatus and method provides for locating and displaying a map of a golf course with the relative location and distance of a golf ball at successive locations from a subject pin or dog leg on the course. The claimed apparatus displays a map indicating the location of the golf ball and the distance to the pin or dog leg during the successive shots.

No showing is made of simultaneously recording and storing object images associated with the location of the golf ball or the player carrying the apparatus.

U.S. patent application Ser. No. 08/191,815 by Janky, et al, incorporated herein by reference, discloses a remote target locator apparatus which incorporates GPS map and target location and display capability. A potential target is illuminated by a thin beam of directed energy and viewed through an imaging device. The returned energy scattered from the target is received and processed to determine a distance value between the locator apparatus and the target.

A GPS antenna array on the locator is used to provide the attitude (ie slope, azimuth) of the pointing beam. A computation means, such as a miniturized single board computer, calculates the location of the remote target relative to the computed and known location and attitude of the locator apparatus. The target image and location coordinates are then transmitted to a selected remote receiver for bringing fire to bear on the target.

No image storage or processing other than transmission is contemplated or discussed in Janky. Also, no provision is made for relating target images to associated map features by geographic location coordinates. It would be advantageous to relate the acquired target to nearby features such as the proximity to sensitive structures or personnel which may be endangered by attack.

U.S. patent application Ser. No. 08/440,246 by Woo, "A satellite Navigation receiver with Map Graphics and Hypertext Driven by a PDF Database", incorporated herein by reference, discloses the use of specially compressed Portable Document Format (PDF) database files to store map graphic data with hypertext links between the location of a self contained navigation receiver, other points of interest and other stored data items such as text, graphics and images. The PDF format is described in *Portable Document Format Reference Manual,* Adobe Systems, Inc., 1993, Addison-Wesley Publishing Company, ISBN 0-21-62628-4. The PDF format permits great detail and high resolution map images and other multi-media entities to be stored with great efficiency. The PDF format enables compact storage, representation and display of graphical map data which is important for portable and hand held equipment in that it minimizes size, power and expense of memory required for storing and displaying graphical map images.

PDF files allow the use of computer files that are indepndnt of the appliation software and operating system to create it. Therefore, PDF files can be readily converted to and from "POSTSCRIPT"™ and Apple Computer "QUICK-DRAW"™ file types. Each PDF file contains a PDF document and other supporting data. Each PDF document has one or more pages which may contain text, graphics and images in a device and resolution independent format. A PDF document may also contain purely electronic representations such as hyper text links. Each PDF file further contains the version of the PDF specification used in the file and information about the important structures in the file.

A commercial product called "PDF Writer"™ and computers running both the Apple MACINTOSH™ and computers running Microsoft "WINDOWS"™ (e.g., GDI) that acts as a printer driver for POSTSCRIPT™ and GDI application programs. A printer driver ordinarily converts operating system graphics and text commands into commands that will be understood by a particular attached printer. Such drivers enbed commands into printer command streams for page printing. The PDF WRITER™ sends such command streams after emvdedding to a PDF file instead. The resulting PDF files are platform independendt, e.g., they may be freely exchanged between MACINTOSH™ and WINDOWS™ computers. PDF files are seven-bit ASCII and may be accessed by PDF viewing applications on any platform, e.g., Adobe ACROBAT EXCHANGE™ running on the MACINTOSH™. The imaging model of the POSTCRIPT™ language is used by PDF to represent text and graphics. A PDF page description draws a page by placing "paint" on selected areas of a blank white page. Painted figures may be letter shapes, regions defined by combinations of lines and curves, or digitally-sampled images of photographs other or images. Such paint can be any color or shade. Any figure can be clipped to another shape, such that only parts of the figure within the shape will appear in the page. PDF uses marking operators similar to POSTCRIPT™ marking operators, but it is not a programming language, and so does not include procedures, variables and control constructs. As a result, applications can more efficiently and reliably locate text strings in PDF files, compared to POSTCRIPT files.

PDF files support industry-standard compression filters likd JPEG compression of color and grayscale images, CCITT Group-3 FAX, CCITT Group-4, Lempel-Ziv_ Welch (LZW) and run length compression of monochrome images and LZW compression of text and graphics. Such compression is important to maximizing how much page information can be stored by any particular memory and the maximum communication rate needed for any particular connection.

It would be an advantage to incorporate efficient file compression, data storage and display techniques into geographically referenced image capture and display apparatus.

U.S. Pat. No. 5,450,344 by Woo, and U.S. Pat. No. 5,422,814 by Sprague, et al, incorporated herein by reference, disclose GPS receivers with Data Ports for uploading and downloading of Absolute Position Information. This is important for providing means for storing and transmitting absolute geographical position data, such as map coordinates, between a GPS receiver and other related equipment, eg, computer storage media (disk, RAM, and the like). By this means, absolute geographical latitude and longitude position data may be related and/or referenced to other associated data items at the time of position capture. Retreiving or storing data items based on a reference to a geographical location is sometimes referred to as geo-addressing.

Geo-addressing generally refers to the absolute latitude and longitude of a geographical location which is related in some way to another object. There may also be associated with a particular geo-address, additional position data such as orientation or attitude (ie azimuthal, elevation and roll from some reference axes) of a line of sight from the specific geo-address to an associated target object and a range or distance between the specific geo-address and the associated object. The term geo-addressing in the present invention includes at least the latitude and longitude in addition to the above position factors.

Recorded digital data: encryption for authentication

In evidentiary proceedings such as photo evidence to be gathered for court testimony, it is important to authenticate the images (or other data) which are recorded at a scene for later use by the court. One method of authentication is to embed a secret or hidden message into the recorded image which is not accessable by an unknowing party. Steganography, from the Greek for 'covered writing', is a form of cryptography in which a first message to be hidden is concealed within another message or image. Steganography is briefly discussed in "Codes and Ciphers" by Fred B. Wrixon, *Prentice Hall General Reference,* New York, N.Y., 1992. One method of concealment expresses each pixel in an electronic representation of the image in digital form and then alters the least significant bit of a chosen number of pixels to contain an authentication message.

These methods usually rely upon some unchanging characteristic or combination of characteristics of an entity that seeks access to a protected system or a protected image for the purposes of changing or displaying some aspect or aspects of the image. The protection offered by these approaches might easily be compromised for an image transmitted over a communication channel that is continually or periodically transmitting information.

What is needed is an approach that relies in part on the constantly changing information associated with signals produced by a location determination system. The changing position/location/time information may be used to authenticate or verify the location and/or angular orientation and/or time of image formation of the entity that forms an image that is to be authenticated, Preferably, the recorded information relied upon for authentication should be accurately available only from the entity that formed the image or from a properly designated agent. Preferably, the approach should accept and work with confidential/encrypted signals and/or with signals that are available for use by any user with an appropriate receiver for a location determination system.

Cryptography in digital systems is discussed in some detail in the *"Encyclopedia of Computer Science",* 3rd Edition, Anthony Ralston and Edwin D. Reilly, Van Nostrand Reinhold, New York, N.Y., 1993, pps 369, 370. Cryptography is the science of transforming messages for the purposes of making the message unintelligible to all but the intended receiver of the message. Data encryption refers to the use of such methods in computer or digital data for the same reason, but also implies the additional goals of providing assurance to the receiver of the message that the message is not a distorted, altered or otherwise changed message or image, and/or allowing the message receiver to prove to a third party that the message is authentic.

The transformation used to encipher a message typically involves both a general method, or algorithm, and a key. While the general method used by a pair of correspondents (eg evidence gatherer and receiver) may be public knowledge, some or all of the key information must be kept secret. The process of transforming (enciphering or encrypting) a message is to apply the enciphering algorithm to the message, where the key is used as an auxiliary input to control the enciphering. the reverse operation (deciphering or decrypting) is performed similarly. The enciphered data is combined with a suitable deciphering algorithm and the corresponding deciphering key, by a suitable deciphereing means, to reveal the original message, image, or data.

Standard enciphering algorithms include simple substitution codes, transposition codes and the like. A provably unbreakable ciphering algorithm is the one-time pad, described, op cit. To encipher a 1000 bit message, however requires the use of a 1000 bit key that will not be used for any other message. Larger messages, e.g., a digital image, may be impractically large or expensive except for the most critical cases. Other ciphering algorithms are the Data Encryption Standard, (DES) approved by the National Bureau of Standards in 1976, various public key systems, such as those developed by Diffie and Hellman, and the Rivest, Shamir, Adleman (RSA cipher) developed in 1978, page 370 op cit.

Incorporating the time of image formation into the algorithm or key structure adds an additional dimension to the ciphering structure. Image formation time may be derived from a built in clock provided as part of the self-contained image recording or position determining system. Time may also be received from an external source, such as the standard time supplied by standard frequency transmission stations throughout the world, whose time signals, carrier and modulation frequencies are very precisely established by the various national laboratories. In the United States, details may be obtained from the Frequency-Time Broadcast Services, National Oceanic and Atmospheric Administration, Boulder, Colo. 80302.

For the purposes of image authentication, a specific recorded digial image or audio waveform stream may be thought of as a particular assembly of digital data; ie, a file, in the form of a sequence or array of bits or bytes.

Recorded Digital Data Formats

Digital data storage in a particular medium may be formatted in a proprietary manner or may be done in some standard format agreed to and published by a relevant standards body. Many standards bodies exist which publish standards for national or worldwide use, such as the ASCII, ANSII, IEEE, and the like. A relevant standard format for storing digital map data (eg. latitude and longitude) is described in the U.S. Department of the Interior, U.S. Geological Survey document FS-122-95, May 1995. The digital image is accompanied by a metadata file that complies with the Federal Geographic Data Committee approved *Content Standards for Digital Geospatial Metadata* (Jun. 8, 1994). This standard is particularly applicable to use in geo-referenced digital applications due to the definitions of standard attribute fields which can be used for storing specific kinds of information. This ensures wide usability among manufacturers and users of hardware and software.

The USGS standard includes fields which provide storage space for containing values of predefined attribute variables. These attribute values may then be used by application programs for controlling the use and display of map data.

It would be an advantage to capture geo-addressed object images using a hand held portable unit in which object image data and other data entities are stored and accessible by hyperlinks between portions of a PDF file.

It would be an advantage to capture geo-addressed digital audio waveform streams using a hand held portable unit in which digital audio waveform streams and other data entities are stored and accessible by hyperlinks between portions of a PDF file.

It would also be an advantage to provide an geo-addressed authentication or authentication means associated with such digital images.

None of the above systems provide rapid selection and display of geographically associated features or data entities related to a geographically related object image. Neither do any of these systems provide for image manipulation and combination other than location and attitude coordinates. Nor do they provide geo-addressed image authentication means.

SUMMARY OF THE INVENTION

It is an object of the invention to provide image data storage in digital format with one or more hyper-links between the image and the image location at the time of data capture.

In one embodiment of the invention it is also an advantage to provide digital image capture, geographical location data storage, multi-media entity storage and retrieval and hyper-links therebetween within a single integrated package.

It is another advantage in accordance with this invention to provide that there is no conversion processes required to get the image data into subsequent digital processing systems. The image data is directly captured digitally and is stored directly on a digital media instead of being stored on a photo sensitive film. Another advantage is the absence of a developing step, between the image capture and the with the resulting cost of using and disposing of chemicals and wasted printing media.

The image data is thus immediately available in real time, and can be manipulated, ie, cropped, magnified, shrunk, rotated and the like by an integral image processing device located within the integrated package or by a image processing device located remotely, such as a digital processing PC, workstation, video player or projection screen.

Another advantage of embodiments in accordance with this invention is, the image data can be immediately combined with other digital data in useful ways, such as superposition, morphing, overlaying and the like. Hyper-links are easily established between geo-addressed image data and one or more geo-addressed features or locations on a digital map and to other multi-media entities, such as video clips, still pictures, graphics, sound clips (waveform files) and the like, by clicking on a related icon or selecting an item from a superimposed menu.

Another advantage of the digital image capture and location feature of the present invention compared to conventional video capture is the absence of undesired multiple frames which requires use of additional storage memory.

As digital memory bit size and cost decreases due to advances in the art of storage memory, digital image storage will become increasingly competitive with the storage capacity, resolution and cost of photographic film.

Digital image storage has an additional advantage over conventional video or film recording of images and locations in that encryption of the image and location data may be done in such a way that the data could be securely protected against subsequent alteration, for example, by locking the recorded image/location data file against rewriting, thereby providing a more defensively robust legal record.

The image authentication needs of the above are met with one steganographic embodiment of the invention, which forms a digitally expressed image, using a digitized image forming means such as a digital camera, and conceals information concerning the circumstances of formation of the image within the image itself, Preferably, this authentication information includes the location, angular orientation, time of image formation and/or distance (range) to a selected object in the image, of the digitized image forming means (referred to herein as a "digital camera" for case of reference) at the time the image was formed. This authentication information is provided, at least in part, by a location and orientation detemining system, also referred to as a geographical position determination system (GPD) that is connected or attached to the digital camera and that provides the desired authentication information at the instant the image is formed. This authentication information is then incorporated in the digital image and/or is provided separately from the image. If the authentication information is incorporated in the image, a set of pixels is chosen from the assembly of pixels that form a visually perceptible image in the digital camera, and these pixels are individually altered to contain appropriate parts of the desired information. The chosen set of pixels for the image is determinable by, or known to, at least one person or facility so that this set of pixels can be retrieved from the digital image and the authentication information can be recovered. The chosen set of pixels need not be adjacent to each other and may be selected arbitrarily or according to some prescribed form, such as a line or curve of pixels, Optionally, the authentication information and/or the specification of the chosen set of pixels in which this information is concealed may be encrypted, using the location and/or orientation and/or time information provided by the GPD to determine the encryption key. Optionally, once the digital image is formed, this image may be "frozen" within the digital camera so that this image and the associated authentication information cannot be deleted or altered in any way but can be displayed visually or downloaded and processed by an authorized downloaded, to exhibit the digital image and the authentication information. The digital image and authentication information is never transmitted to another person or facility and thus is not interceptable or vulnerable to deletion or alteration by a person or facility with a different agenda.

This invention will be useful where a digital image and its associated authentication information is to be formed and preserved for later display in unalterable form, This invention can be used in civil or criminal proceedings before a court or administrative entity to "preserve the scene" and can be used for preservation and identification of personally produced images for subsequent viewing.

Additional advantages of hyper-linked digital image/location data files in accordance with the present invention are that many individually geo-addressed location images or sequences of images (movie-like or video-like clips) may be recorded and accessed for use time and time again. Digital images can be instantly resized and viewed in any desired image size. The image/location files may be distributed and viewed on a PC, a video screen, a projection screen and the like.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein;

FIG. 10 indicates the recording data format for digital audio tape showing the LSB to contain encrypted position data bits for one embodiment of the present invention.

FIG. 11 illustrates a system embodiment of the present invention including a dual-hemisphere fish-eye lens for recording images over nearly the total total solid angle around the system.

DETAILED DESCRIPTION OF A PREFERRED EMBODIMENT OF THE INVENTION

Figure 1:
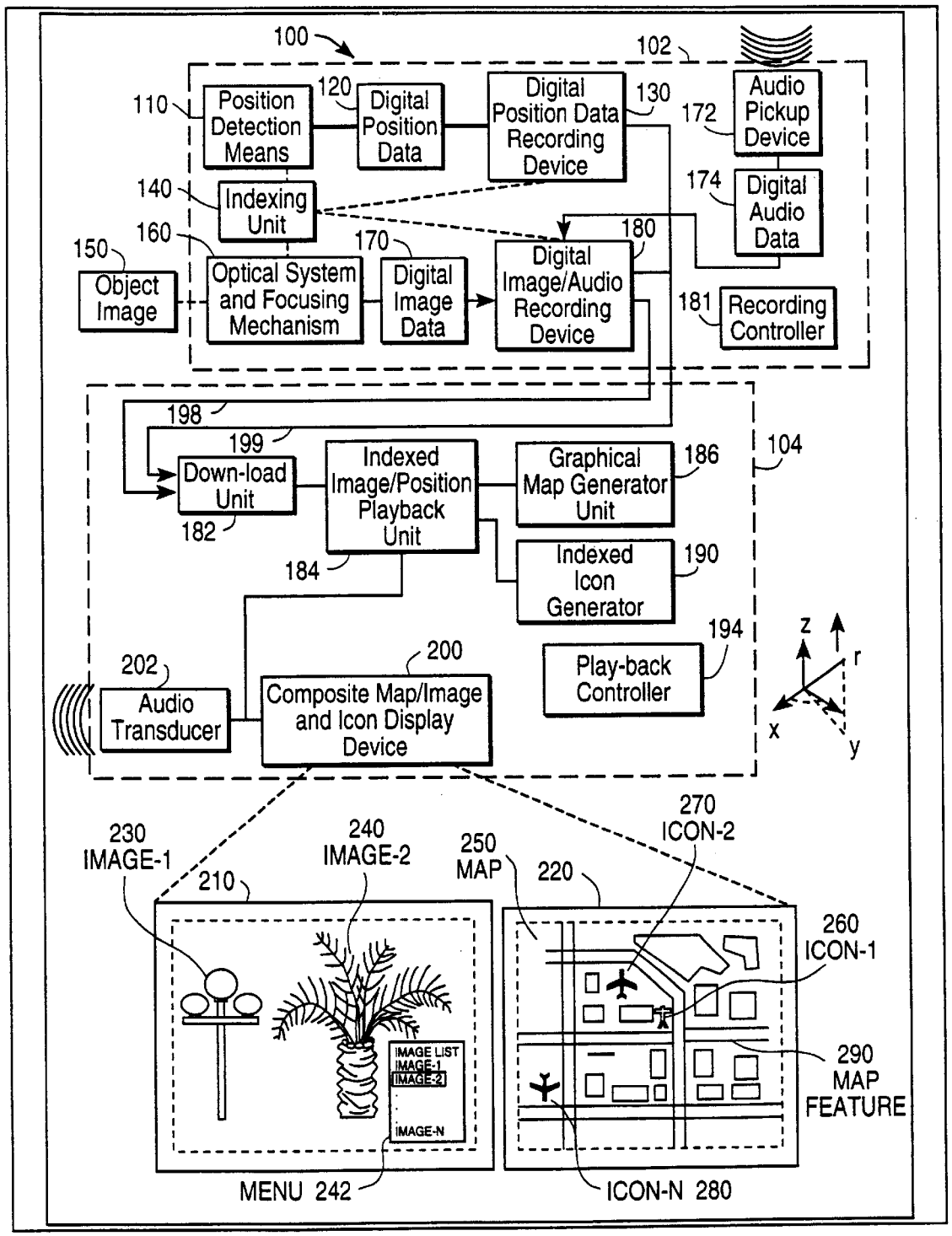
FIG. 1 illustrates a schematic diagram of a first embodiment of a geographical position/image digital recording and display system of the present invention.

With reference to FIG. 1, there is shown a first embodiment of a position/image digital recording and display system 100 in accordance with this invention. The system 100 includes a digital data recording unit 102, connected to a digital data play back unit 104.

The digital data recording unit 102 includes a geographical position detector (GPD) 110, capable of outputting digital position data 120, a digital position data recorder 130, and an indexing unit 140. The unit 102 also includes an optical system and focusing mechanism 160, capable of outputting digital image data 170 captured from an object image 150, to a digital image/audio recording device (IRD) 180. Optionally, the recording unit 102 may include an audio pickup device 172 capable of outputting digital audio data 174 to the IRD 180.

The GPD 110 is capable of providing digital geographical position data 120 to a digital position data recorder (GPDR) 130. The GPDR 130 and the IRD 180 may each be separate mass storage devices such as a magnetic storage device (e.g. a disk drive or tape drive system), a dynamic or static RAM (SRAM or DRAM), a semiconductor flash memory, a write-once-read-many (WORM) memory and the like. The GPDR 130 and the IRD 180 may also be combined into one integral recording device capable of storing digital geographical position data, image data and audio data in a suitable file structure.

The object image 150 is captured by means of the optical path system (OPS) 160. The OPS 160 may include a conventional lens and focusing mechanism for coupling the image 150 to an imaging array of light sensitive photo diode or charge-coupled-device (CCD) cells on a semiconductor circuit (not shown), A typical array size would be 480 by 720 cells. In an embodiment using a CCD array, each CCD cell produces an analog output signal representative of the intensity and color of the light from one pixel of the object image 150.

The analog output signal from each pixel is processed, for example, by converting with an analog to digital converter (A/D) (not shown) into an assembly of bits, typically into a digital signal of 24 bits for each pixel. The assembly of bits may be grouped as a sequential stream, or as a group of parallel words, for example, three 8-bit words.

The assembly of bits signals from all the pixels are combined into a digital frame signal by scanning over the imaging array. The digital frame signal represents the complete digital image data 170 of the object image 150. The total number of bits in a digital frame signal required to represent the entire image 150 depends on the number of pixels in the imaging array.

It is contemplated that other photosensitive array image to digital data converter structures known in the art may also be used. The digital object image data 170 is processed and stored in the IRD180, for example, as a digital image data file, If.

An audio pickup device 172 is provided for receiving audio waveforms at essentially the same time the object image 150 is being recorded. The device 172 includes a transducer (not shown) which provides digital audio data 174 to the recording device 180. The digital audio data 174 represents the audio waveform received by the device 172. The digital audio data 174 is recorded and stored as a digital audio data file, Af, along with the object image data If. The audio device 172 may be a microphone aimed at the object 150 to pick up sounds produced by the object or may be used to provide voice over commentary by the user of the system 100.

The digital audio/image recording device IRD 180 and the GPDR 130 may be mass storage device such as a magnetic storage device (e.g. a disk drive or tape drive system), a dynamic or static RAM (SRAM or DRAM) a semiconductor flash memory, a write-once-read-many (WORM) memory and the like.

The recording unit 102 also includes a recording controller 181 which is provided with suitable control and data connections means (not shown) to and from the GPD 110, the GPDR 130, the optical system 160, the audio pickup device 172 and the IRD 180 for controlling the sequence and timing of the capture and recording of the system 102 position at the time of capture and recording of the object image 150 and audio data Af. Means may also be provided for recording the time, Ti, of the capture of the image 150 as image data, If, which is associated with the geographical location, Li, determined at the time, Ti, therewith. The digital object image data 170, and the digital audio data 174 is automatically geo-addressed to the position where the image 150 was captured. The digital object image data 170 and digital audio data 174 thus may be stored with reference to a geo-addressed map during later playback as described below.

The image data, If, with the geographical location, $L_i$, may associated by means of an processing unit 140. The processing unit 140 provides an index number, $N_i$, which is recorded along with the digital location data, $L_i$, and the digital image data, Ii, for post processing as explained below.

At a time later than the capture of the image 150 as image data, If, and the recording of the geographical position, $L_i$, and time Ti, the playback unit 104 is activated to down-load the image data, If, the position data, L, and the time, Ti, associated with the index number, N.

The playback unit 104 includes a down load unit 182, an indexed image/position playback unit 184, a graphical map generator unit 186, an indexed icon generator 190, a playback controller 194, digital audio/image data loading connection 198 and digital position data loading connection 199, a composite map/image/position viewer unit 200 and an audio output transducer 202.

The connections 198 and 199 are configured to transfer the audio/image data, If, and the position data, $L_i$, by means of the down load unit 182, into the playback unit 184. The playback unit 184 combines the output of the graphical map generator unit 186 with the indexed icon generator 190 under control of the play-back controller 194, to drive the display device 200 and transducer 202 in order to output selected audio streams, display images, locations and icons as described below.

FIG. 1 illustrates one example of the type of displays contemplated as features in accordance with the invention. The viewer 200 may be a conventional LCD display configured to show a first screen 210 adjacent to a second screen 220. The first screen 210, under control of the playback controller 194, displays a first image 230 and a second image 240. The second screen 220 displays a map 250, upon which are displayed a plurality of icons such as a first icon 260, a second icon 270, up to icon-N 280. The map 250 displays map features 290 such as streets, building outlines, text and other structures. Alternatively, the screen 210 and screen 220 may be shown individually and sequentially by toggling back and forth from one another under control of the controller 194. The first image 230 is associated with the first icon 260. The second image 240 is associated with the second icon 270. The location of the icons 260, 270 on the map 250 correspond to the geographical location of the corresponding images 230, 240 at the time the images were recorded by the recording unit 102. The location of the icon 280 represents still another image that was recorded at a different geographical position or at a different time than image 230 and image 240 which has not yet been activated for display.

The link between a recorded digital image data, If, and its corresponding geographical position data, $L_i$, is provided by activating an associated icon. Each icon represents and activates a hyper-media link between the geographical location of the icon on the map, and the associated multi-media entity, image, audio stream, or feature data represented. The selected data is then retrieved from the stored data file and displayed or played on the appropriate reproducing device: the viewer 200 in the case of visual image data; or the audio transducer 202 in the case of audio stream data.

Icons may be generated by the icon generator 194. Icons may be generated automatically, under control of the playback controller 194, or selected by the user, who may select icons for each image, from a menu provided on the screen 210, or may be provided by action of the recording controller 181 during recording of the image, under a predetermined protocol. Activation of an icon may be done in the conventional mouse controlled cursor manner, in which a cursor 282 is positioned on the screen 210, over an icon, and then activating the icon by double clicking on a mouse button (not shown).

Images may also be selected from a image list menu 242 displayed on the viewer 200 by positioning the cursor 282 over the image name on the menu 242 and clicking on the mouse button. The menu 242 may represent a list of sorted image names contained in the digital multi-media file. Alternatively, the menu 242 may display a list of sorted multi-media entity names such as audio clips, video clips and the like for selection by the user.

The image associated with icon 280 is not shown on the screen 210, because the icon 280 has not yet been activated. The images associated with different icons may be displayed in a number of different ways. Images from different locations may be viewed alongside each other, superimposed, cascaded or tiled as is well known in the art. Images may be de-selected by clicking again on the associated image icon or image name. The playback controller 194 can be configured to provide image transformations on the recorded image data, and the other recorded data, such as sizing, rotation, morphing and the like by software and hardware techniques well known in the art.

PREFERRED EMBODIMENT

In a preferred embodiment of the system 100, the geographical location data Li, the corresponding digital image data file If, the corresponding digital audio data file Af, and the corresponding time Ti, are stored as hypertext or hypermedia items as a single data file in a mass storage device (not shown, similar to that of device 130 and device 180) included in the playback unit 184.

A preferred data format for the combined data file stored in the unit 184 is the PDF file format, supra. The hypermedia items in the combined data file are connected by suitable hyper-links activated by corresponding icons such as icons 260, 270, 280 and the like. The icons 260 et al, may be connected to a geo-referenced map stored in the device unit 184.

Alternatively, the hyper-linked data files may be stored in other digital storage means in the playback unit 104, or in removable digital storage media coupled to the playback unit 104.

In a preferred embodiment of the system 100, the image data for images 230, 240 and the like, the feature data for features 290, the multi-media entity data and the map data for the map 250 is stored as a compressed digital multi-media file (MMF) (not shown). A preferred format of the MMF is the Portable Document Format (PDF) described in the aforementioned *Portable Document Format Reference Manual,* Adobe Systems, Inc., 1993, Addison-Wesley Publishing Company, ISBN 0-21-62628-4.

In operation, a user would first capture one or more object images 150, with the recording unit 102 while traversing some open area such as a city, town, theme park, or shopping center. The user may also record audio segments during the image capture by activating suitable control switches or buttons (not shown) on the recording unit 102. The user may move around the area freely taking pictures and recording audio. The images and audio captured are automatically referenced to the geographic location of the user at the time capture is made.

Hyper-links relating recorded images and other data objects (eg, date, time geographical coordinates, feature name, and the like ) may be created on-the-fly by a predetermined protocol, or may be created at the option of the operator of the camera by actuation of suitable control switches. Hyper-links thus created may then be stored in the same storage media After completing the image and audio capture phase, for example, at the end of a tour or visit, the user would return the recording unit 102 to a central location. The recording unit 102 and playback unit 104 would be connected by means of the down load connections 198 and 199. The image data 170, the audio data 174, and the geo-addressed position data would be down loaded into the play back unit 104 as a multi-media data file (not shown), preferably in a PDF format. The user then could view the selected images 170 and listen to the selected audio data 174 by activating the hyper links to the loaded multi-media data file and represented by the icons 260, 270 and the like, provided on the geo-addressed map 150.

In an optional alternative of this embodiment, additional multi-media entities could be loaded into the multi-media data file and activated by associated hyper-link icons. Examples of these additional entities could be pictures, graphics, catalogs, video clips or audio clips of products and services available from commercial organizations associated with the geographical locations at which the images 150 were recorded. This could serve as a reminder of products or services of which the user may wish to take advantage at a time later than the actual tour or visit to the area at which they were present.

In another embodiment of the system 100 in accordance with this invention, the downloading connections 198 and 199 could be radio links between the recording unit 102 and the playback unit 104. In this case the recording unit 102 would not have to be returned to the same location as the playback unit 104, but instead could download the digital image data 170, the digital audio data 174 and the position data 130 by radio signals through a suitable radio transmitter (not shown) in the recording unit 102 to a corresponding radio receiver (not show) in the playback unit 104.

Alternatively, the connections 198, 199 could also incorporate a data modem and conventional phone lines or cellular phone contact making contact to a receiving modem and computer (not shown) located in the down-load unit 182.

In this case, it may be an advantage to compress the data files 170, 174, 120 prior to transmission by using the capability of a data compression methodolgy such as JPEG, or MPEG for the image files and other data compression means known in the art such as G.722 or Dolby AC, for the audio files. Speech and image compression methods are discussed in T. J. Lynch, *Data Compression: Techniques and Applications,* Belmont, Calif., *Lifetime Learning Publications,* 1985.

Continuous Sequential Frame embodiment

In another embodiment of the system 100, there is included the capability of recording images as an assembly of continuous sequential frames, enabled by depressing an actuation switch or button (not shown). The frame rate may be preprogrammed or selectable by the operator. Frame rates can be selectable to be 1 or 5 or more frames per second. For video, the frame rate may be selected to be the standard video frame rate of 30 frames per second. The resolution of the image will depend on the type of imaging mechanism selected.

The output signal is typically translated into a 24 bit digital signal representing 8 bits of luminance data and 16 bits of chrominance data for each image pixel. One standard for video signals is the 1981 standard set by the International Radio Consultative Committee (CCIR), "Recommendations and Reports of the CCIR Plenary Assembly-1982," Vol. XI, "Broadcasting Service (Televsion)," International Telecommunications Union, Geneva, 1982. In this standard the luminance and chrominance signals are encoded separately.

The luminance signal Y (the sum of the R, G, B camera signals) is passed through an A/D converter and an encoder that encodes it at 13.5 megasamples per second, while the color-differences values (R-Y and B-Y) are encoded at 6.75 megasamples per second. The signals are encdoded in words of 8 bits each (256 levels), i.e., at a bit rate of 8×13.5=108 Mb/s for luminance and 54 Mb/s for each color-difference signal. The total base bandwidth of the digitized image signal thus is 216 Mb/s.

Commercial digital camera modules are available which provide the necessary capability for the mechanism 160 of converting object images into digital image data at the desired frame sequence rates. One commercial video camera module are the Hitachi digital video camera modules, "VK-C25" and "VK-C27" available from Hitachi Inc., Brisbane, Calif. The Hitachi "VK-C25" and "VK-C27" include an A/D converter for converting the analog image from the CCD to a data stream which is processed by a luminance and chrominance DSP processor. An embedded controller and interface controller provide control for signals between the imager, the DSP processor, the other system elements, and connections to the external environment.

Commercial cameras having single frame digital image recording capabilities are also available. These include the Casio "QV-10"™, The Apple "QuickTake 150"™, the Kodak "Digital Camera 40"™, and the Dycam "4XL"™.

These digital cameras utilize a charge-coupled-device (CCD) imager delivering pictures of images up to full VGA resolution and up to 756-by-504 pixels. In the video embodiment of the system 100, the mechanism 170 is provided with the capability of outputting digital frame data at a rate suitable for storing in the recording device 180. The device 180 is typically a flash memory or dynamic ram (DRAM) of a size sufficient to store the desired frame sequence length. Because the image data bit rates may exceed 200 Mb/s, the mechanism 160 may include a data compressor such as a high performance DSP. Dedicated integrated digital video compression circuits are available which supply data compression factors of up to 100:1 for video data, eg, from Intel Corp., Santa Clara, Calif. and $C^3$ Corp., Santa Clara, Calif.

The recording device 180 may be a DRAM, flash memory or writable optical disk, capable of storing sequences of digital image frame data to the desired length. With suitable data compression, a writable optical disk of 600 Mbyte capacity can store up to 60 minutes of video data.

For secure data applications, an irreversible "write once, read many times" (WORM) disk may be used. A disc coated with tellurium suboxide is laid down as a 0.1 micon amporphous layer. On heating to about 150 degree C., by a laser beam, the layer crystallizes and the surface beomes twice as reflective. Since the reaction is irreversible, the data, once written, cannot be changed. This has application in addition to encryption techniques as discussed further, below.

ALTERNATIVE EMBODIMENT

Figure 2:
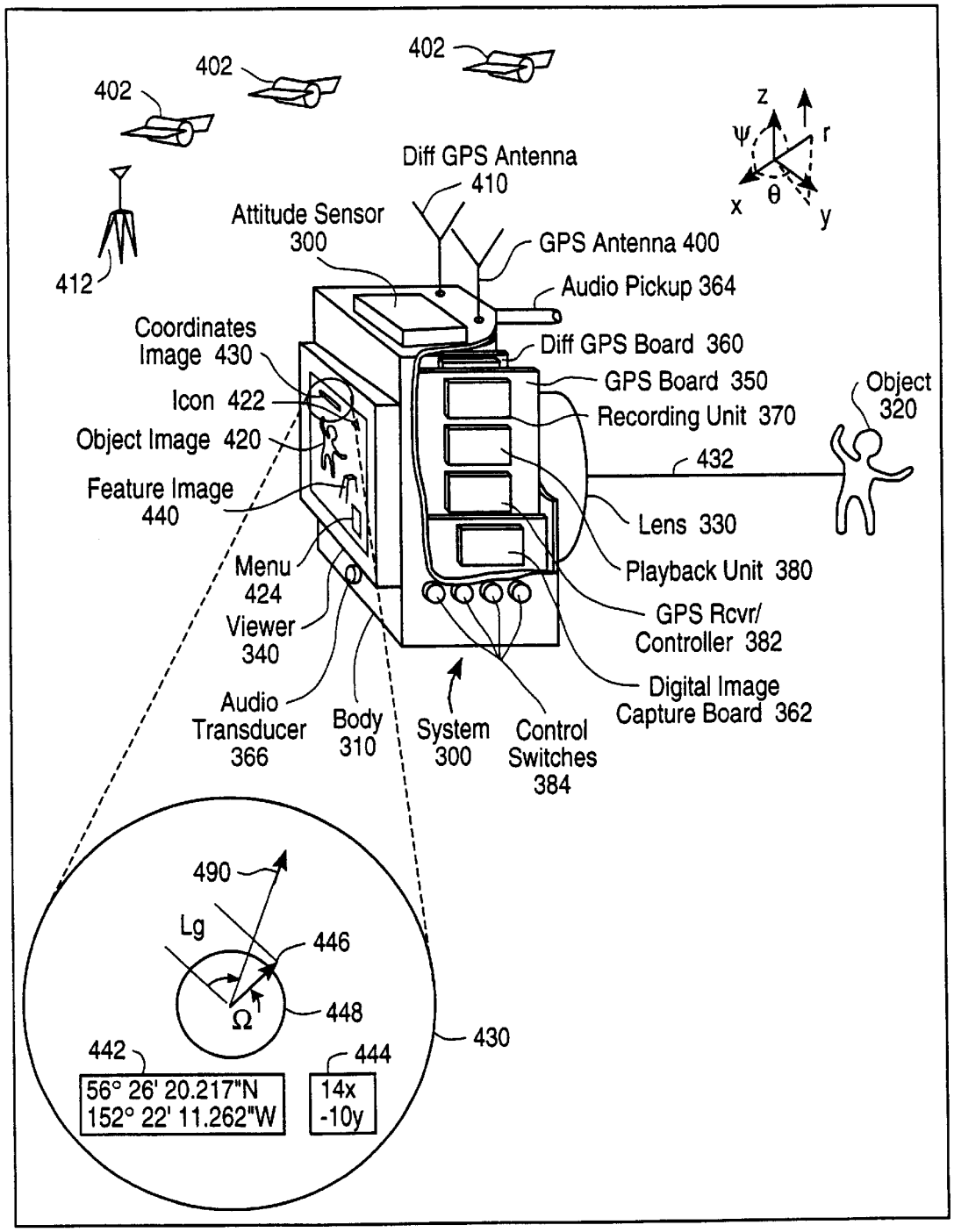
FIG. 2 depicts a schematic diagram of a highly integrated, hand-held portable embodiment of the present invention.

With reference to FIG. 2, there is shown an partially cut away illustration of an alternate embodiment of a highly integrated geographical position/image digital recording and displaying system 300 in accordance with the present invention. In the following discussion, geographical position includes the Cartesian coordinates (x, y, z) location of a reference point for the system 300 (such as the center of gravity) relative to a reference coordinate frame, as well as the range, r, and orientation or attitude coordinates of reference axes (θ, azimuth angle, or heading, φ, elevation angle, or pitch, and ψ, roll angle) of the system 300 relative to the reference coordinate frame when pointing at a reference object 320.

The system 300 includes a camera body 310 having an optical lens system 330 disposed on the body, for example on one side, for focusing on the object 320. The lens system 330 defines an optical axis 332 projecting outward from the camera body 310. A display viewer 340 is also disposed on the camera body 310, for example on a side opposed to the one side containing the lens system 330. Alternatively, the lens 330 and viewer 340 may be disposed on adjacent sides of the body 310, or may be mounted to be movable relative to each other and also movable relative to the balance of the camera body 310.

The optical axis 332 is defined such that, with the optical axis aligned through an object point on an object 320 (eg the centroid of the body 320) an image of the object point will be displayed on the viewer 340 at a predetermined image point (for example, the center) of the viewer 340.

The system 300 may include a range measuring or autofocus mechanism (not shown) as is well known in the art for providing range data between the camera body 310 and the object 320. In contrast to the system 100 described with reference to FIG. 1, the system 300 is totally integrated into a portable hand-held unit having the image capture function, the locating function and the play back function combined in a single package enabling the user to take and view pictures which are automatically geo-addressed and time stamped.

The lens system 300 may include a distance measuring mechanism (not shown) which may be provided with output means for outputting and storing digital distance or range, r, data between the system 300 and the object 320. Additional features are incorporated into the portable system 300 which are described in detail below.

The camera body 310 encloses a GPS printed circuit board 350, a Differential Ready GPS (DGPS) printed circuit board 360, and a digital image capture board 362. The DGPS board 360 may use a commonly available technique such as those tuned to a FM channel, using an FM subcarrier demodulator, or a UHF, or VHF subcarrier system.

The exterior of the camera body 310 supports an audio pickup device 364 and an audio transducer 366, an attitude sensor 390, a GPS antenna 400, and a DGPS antenna 410. The circuit boards 350, 360 and 362 are fabricated from conventional insulating substrate material, such as FR-4, and contain suitable electronic circuits components interconnected for performing the functions herein described. The circuit boards are patterned with conductive traces interconnecting the components mounted thereon.

The attitude sensor 390 provides attitude signals proportional to the attitude of the optical axis 332 of the lens system, relative to the reference coordinate system. camera body Commercial GPS and DGPS equipment which are integrated into one package is available on the market and can be adapted to a suitable integrated form factor for packaging into the system 300 by one having ordinary skill in the art. Some aspects and examples of integrated, computer controlled DGPS and GPS receivers suitable for such use are discussed in Gildea, pending U.S. patent application Ser. Nos. 08/191,274, 08/225,125, 07/978,274 and to an application of Steiner et al., U.S. patent application Ser. No. 08/293,048, herein incorporated by reference.

The GPS antenna 400 and DGPS antenna 410 are affixed to the camera body 310 such that they are oriented for generally optimum reception of radio signals from supporting GPS satellites 402 and DGPS transmitting station 412, respectively, when the camera body 310 is being held in the normal position of use. The GPS antenna 400 and the DGPS antenna 410 communicate position and position error correction information to the respective GPS receiver 382 and DGPS board 360. The DGPS board and GPS board cooperate to automatically update the geo-position of the system 300.

The GPS board 350 includes a recording unit 370, a playback unit 380 and a highly integrated GPS receiver/controller unit 382 with appropriate interconnections for exchanging control signals and data. The recording unit 370, the playback unit 380 and GPS receiver 382 perform the same functions as described with reference to the system 100 of FIG. 1. The controller 382 may include a microprocessor, such as an Intel 80486, RAM, ROM and associated peripheral circuits running one or more suitable stored programs such as an operating system and application programs. The playback unit 380 may include a large capacity store, such as a mini-hard disk, large flash memory, writable optical disk and the like.

Actuation of one control switch 384 causes the controller 382 to capture the object image 420 and the current geo-location of the camera system 300. The controller also automatically associates the image 420 with the geo-address of the camera system 300. As in the case of the system of FIG. 1, the image 420 is stored as digital data along with the geo-address data by the controller 382 for access by the playback unit 380.

The playback unit 380 is also configured to store and retrieve geo-addressed digital multi-media entities such as a map data base, a point-of-interest data base, a feature data base, graphical images, video images (clips), still photo images, audio clips and the like as hypertext linked multi-media entities under control of the controller 382 and one or more control switches 384.

The controller 382 is configured to control the playback unit 380 to display a number of different data formats on the viewer 340 upon suitable actuation of the control switches 384. With reference to the screen 210 and screen 220 of FIG. 1, the viewer 340 of FIG. 2 may similarly be activated to view the object image 420, coordinates image 430, a menu 424 of images or other hyper-media entities, one or more icons 422 and feature images 440. These entity images may be viewed simultaneously, alternately, or superimposed on a map image based on the associated geo-address of the subject entity.

The system 300 includes a digital map database, a geo-addressed feature location and icon database (not shown) as described with reference to FIG. 1. The system 300 also includes feature location software (not shown) for accessing and displaying the geo-address feature locations and icons in a coordinate system. The camera system 300 is also provided with hyper-links between one or more icons 420, geo-coordinates 430 and other multi-media entities stored in the PDF data files in the camera system 300.

The camera system 300 may use the geo-addressed data base and the geo-address of the system 300 to find the nearest named feature 290. The system 300 is configured to retrieve and store the name of the nearest feature 290, such as 'Eiffel Tower', or 'Grand Canyon', onto the displayed and stored image 420.

The system 300 includes one or more attitude sensors 390, integrated into the camera body 310 which stores digital attitude output signals (not shown). The digital attitude output signals may be displayed on the viewer 340 separately from, or as part of, the photo image 420 as attitude coordinates of the camera body 310 such as azimuth angle (heading), pitch, (elevation angle) or roll (angle of the camera body 310 about the optical axis).

The attitude sensors 390 may include an electronic azimuth sensor or electronic compass, such as a flux gate compass, or a single or dual axis tilt sensor and the like. An alternate attitude sensing system is a two or three (or more) antenna GPS system such as that described above and further described in patent applications by Gildea, U.S. Ser. No. 08/191,274, 08/225,125, 07/978,274 and PCT/US95/014 herein incorporated by reference.

The digital attitude output signals may also be stored as digital attitude output data in the recording unit 370, at essentially the same time as that when an object image 420 and the geographical location of the camera 310 is captured and recorded.

The attitude sensor 390 contains sensors measuring angular orientation of the system 300 such as azimuth, elevation and roll, and enable the system 300 to uniquely identify the orientation of the optical axis 332, and thus the camera body 310, while viewing the object 320. With sufficiently precise geographical position sensors and attitude sensors, the camera body 310 may be positioned exactly in geographic position and angular orientation which matches a previously stored position and orientation.

The addition of attitude sensing on the system 300 also enables a more accurate calculation of the nearest named feature 440 from the stored feature data base (not shown), since one could be looking in one direction at a first feature while standing nearer another feature. Incorporating nearest named feature calculation using attitude sensing prevents inadvertent mis-labeling of the wrong image.

The calculation of nearest named feature 440 may be limited by disabling the labeling of the object image unless the feature 440 is closer than some predetermined distance to the system 300.

The system 300 may also be integrated into an electronic theodolite or total station with either coaxial or offset optics to store more precise attitude (azimuth, elevation, roll or tilts) onto or with the stored digital image.

The coordinate images 430 of outputs of the sensors 390 can be viewed in the viewfinder 340 in real time allowing precise positioning of the system 300 in relation to a predetermined location and orientation. In this manner, an operator of the system 300 can return to a previously known location and orient the system 300 in precisely the same location and angular orientation to view the surroundings, eg, the object 320, in exactly the same way as they were previously viewed. A new image can then be recorded and stamped with the date, time and position coordinates for subsequent comparison to a previously recorded image of the object 320 from the same coordinates.

The system 300 may also be configured to take multiple sequential image frames as described above with reference to FIG. 1. Highly integrated DSP data compression circuits and advanced software packages may be incorporated by one skilled in the art to provide capability for recording digital video frames and storing in high density mass storage devices. Compact multi-Gbyte, low power disk drives for storing long sequences of compressed digital video sequences are well within the state of the art.

The digital camera system 300 holds a digital map data base. The map database is viewed on the viewer 340, complete with an icon 422 showing the users current position on that map.

The system 300 may be configured to display the camera body 310 position and angular orientation on the viewer 340 in several useful ways. With reference to FIG. 2, a coordinate image inset 430, illustrates several different displays contemplated for the system 300. The coordinate image 430 includes a latitude, longitude numeric display 442 of the present location of the camera body 310. The latitude, longitude numeric display 442 may also show a previously stored location. The display 442 may be toggled back and forth between previous and present location, by one of the control switches 384. Alternatively, the present and previous locations can be displayed adjacent to one another.

A numeric difference graphic 444 may be used to display the numerical difference between the present camera 310 location (and orientation) and a previously stored geographical location (and orientation). Alternatively, a difference indicator graphic 446 may be displayed. The graphic 446 illustrates a vector having a length, Lg, and an angular displacement, $\Omega$. The angular displacement, $\Omega$, represents the angular difference between the present angular orientation (for example, heading) of the optical axis 332 of the camera 310, and a previously stored angular orientation, 490. Lg represents the spatial displacement of the camera body 310, from a previously stored geographical location. A error boundary graphic 448 defines a position difference limit below which further improvement is unnecessary.

By observing one or more of the displays 442, 444 and 446, the operator of the system 300, may reposition the camera body 310 into precisely the same location and orientation as a previously stored location and orientation.

The digital location/camera system 300 may be configured for the consumer market as a convenient hand held portable consumer device using low accuracy/low cost GPS sensors or is configured with more precise components as an industrial grade product for mounting on a pole or tripod.

In one mode of operation the camera system 300 continuously updates and displays GPS position so one can see image and position while continuously moving. The image 420, the geo-address location and attitude coordinates of the system 300 are captured when activated by one of the suitable control switches 384.

Applications contemplated for the system 300 in accordance with the present invention include segmentation surveys in which an operator studies building foundations by periodically taking photographs of the foundations from the same place with the same orientation. The operator then takes measurements from the periodic pictures of the building to determine possible movements occurring between pictures. Obviously, recreating accurate camera position and orientation is crucial to permit accurate measurement of the building movement Other applications include police or insurance agent analysis of auto accidents in which location and orientation of successive pictures from multiple positions, say position A, B and C, are taken and stored. The recorded information is stored digitally, either on the digital image data or as part of a data file that is linked to the image data. Photogrammetric or high accuracy digital photographic systems incorporating an embodiment of the highly integrated system 300 for making, storing and displaying more precise measurements may use more precise attitude and location sensors for location and orientation.

One example of photogrammetric applications are in aircraft, in which a digital location/camera system looks out the bottom of the aircraft which flies over an area and takes pictures. Photos from multiple locations are used to generate a three dimensional stereo image, then create a model. Currently, no existing photogrammetric cameras integrate GPS in them. Some existing photogrammetric systems use a separate GPS system as a sensor which sends a message to a camera indicating to take a picture at that time, or sends location data to the camera which is recorded on photographic film. Alternatively, some existing systems have a camera which sends a pulse to a separate GPS unit to record the location at the time the camera opens the shutter. In post processing at an office, the stored data of location associated with that photo is used to derive other information. None of these systems provide real time update of position on a display as a single integrated package.

Another application is in terrestrial photogrammetry in which the location/camera system 300 is mounted on top of and aligned with a theodolite, or total station. In use, the theodolite is oriented in a certain direction and the camera/system 300 is actuated to record a digital image. The theodolite attitude and geo-position from the incorporated GPS receiver is digitally recorded along with the image. The optical lens system 330 may be mounted with the theodolite in the manner of a reflex camera or the optics may be mounted coaxially to a lens the user looks through. In either case the photosensing apparatus of the digital image capture board 362 receives the image of the viewed object. When a reading is recorded, for example by pushing one of the control switches 384, the instrument's horizontal angle, the vertical angle will be known from the theodolite and the total station's position will known from the GPS receiver board 350. That information is provided in digital format to the recording unit 370 and is stored on or with the digital image data. The advantage of integrating the system 300 into a theodolite, is the much higher accuracy obtainable on the angular measurement, than would be obtained from an electronic compass, which may be subject to magnetic fields.

Still another application can be in the general tourist market. A tourist carrying a hand-held system 300 containing a digital map of a town, may move around the town while viewing the surroundings through the viewer 340 and also viewing the map of the town at the same time showing his position and orientation on the map. The tourist may take photos of companions adjacent to a nearest stored feature 440 and store the image 420 along with the name of the feature. Later the image 420 can be retrieved and displayed on the viewer 340 by activating a hyper-link (not shown) between an icon 422 and the stored image data (not shown), as described with regard to FIG. 1, by the feature's name, geo-address coordinates 430 or icon 422.

In addition to capturing images as separate still frames incorporating geo-address coordinates (position, orientation and/or time), a continuous sequence of frames can be captured in a format suitable for playing back as a conventional video sequence. At least one of the control switches 384 can be configured to control the beginning and ending of a sequence of frames (e.g., a 'clip'), for example by toggling the button on and off.

By suitable hardware and programming stored on the digital image capture board 362, the system 300 can record a time and geo-addressed sequence, or 'clip' of succesive digital images using conventional digital video techniques at the standard video frame rate and store them as digitized video images recorded on the recording unit 370. Each successive frame may be geo-addressed individually, or the 'clip' as a whole may be geo-addressed as a unit.

Frame rates may be fixed, variable or selectable under the control of the capture board 362. The recording unit 370 may also incorporate or be attached to a standard VCR tape recording unit (not shown) so that a simultaneously recorded video 'clip' may be played at some later time on a conventional VCR. A brief summary of digital video techniques and a related bibliography is discussed in the Electronic Engineers' Handbook, op cit pages 20–21,126.

Figure 3:
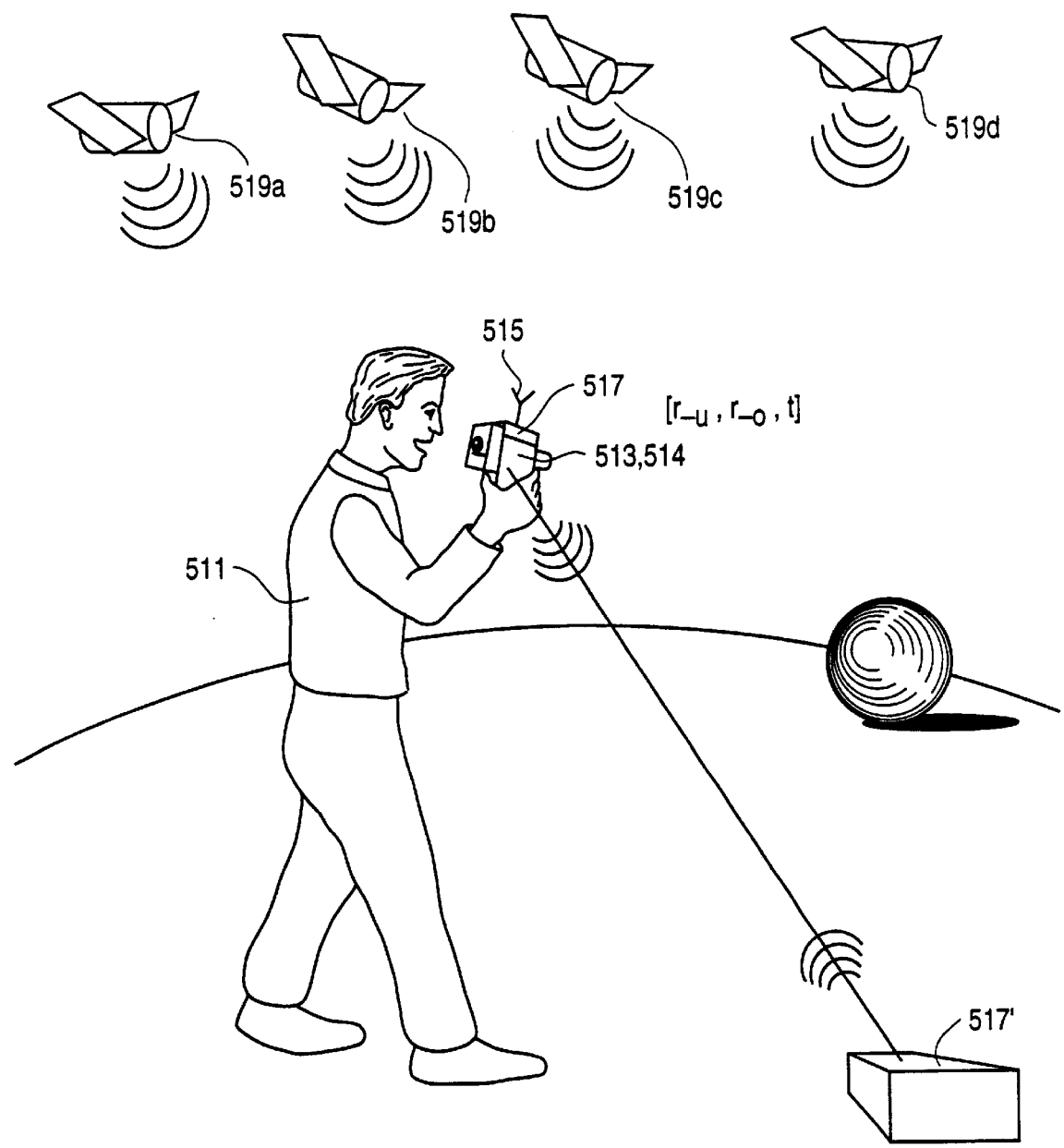
FIG. 3 illustrates use of one embodiment of the present invention in an environment where the location, angular orientation and/or time information for the GPD is provided by satellite sources of GPD signals.

With reference to FIG. 3, there is shown an image authenticating geographical position/image recording system embodiment of the present invention directed toward authenticated evidentiary proceedings.

Figure 4:
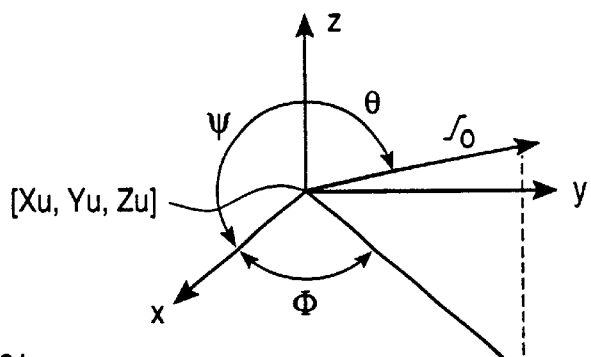
FIG. 4 is a representation of a generalized coordinate system for defining position of an embodiment of the geographical position/image recording apparatus in accordance with this invention.

FIG. 3 illustrates use of the invention in one environment. A user 511, positioned at a particular location with location vector ru=(xu, yu, zu) in a selected coordinate system CS, points or orients a digitized image forming device ("digital camera") 513 in a selected direction having an orientation vector ro=(cos$\phi$ sin$\theta$, sin$\phi$cos$\theta$, cos$\theta$), where $\phi$ is the azimuthal angle and $\theta$ is the polar angle of the vector ro, measured relative to the axes of the selected coordinate system CS, as indicated in FIG. 4. In FIG. 4, for definiteness, the coordinate system used for (xu, yu, zu) is assumed to be a three-dimensional Cartesian system. However, the coordinate system CS can also be at three-dimensional or two-dimensional coordinate system, as noted above.

A positioning determining system (GPD) signal antenna 515 is rigidly attached to the digital camera 513 and receives a GPD signal from of a plurality of GPD satellite sources 519A, 519B, 519C, 519D, etc. of the GPD signals and passes the GPD signals to a GPD signal receiver/processor 517' that is preferably also attached to the digital camera 513. Alternatively, the GPD receiver/processor 517 can spaced apart from, be linked to and receive signls, from the GPD antenna 15 by a cable link or a wireless link 521L (optional).

Figure 5:
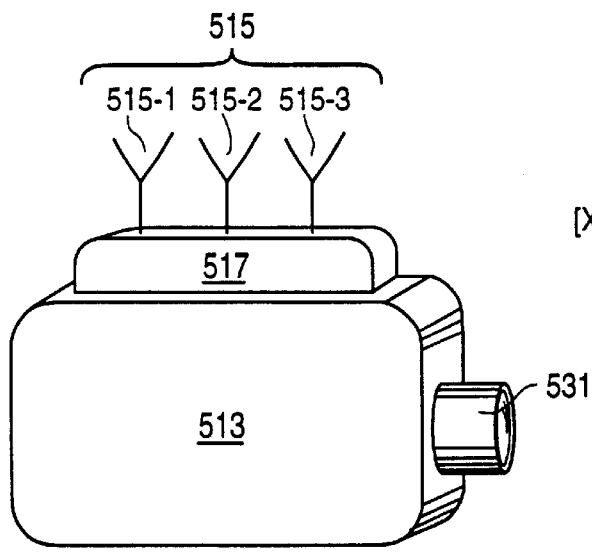
FIG. 5 is a schematic view of placement of three component antennas included in the antenna according to one embodiment of the geographical position/image recording apparatus in accordance with this invention.
Figure 6:
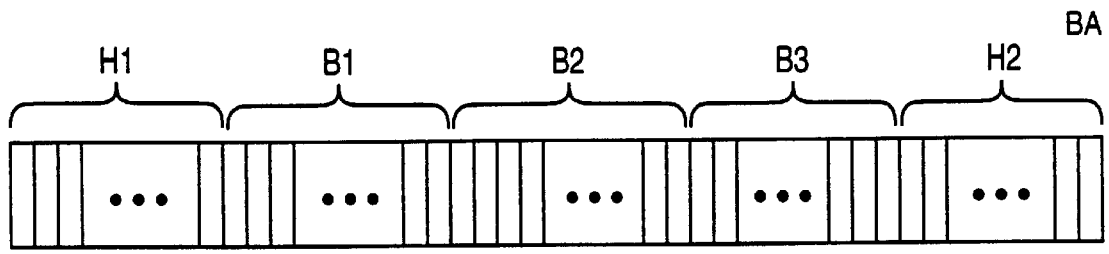
FIG. 6 illustrates one suitable assignment of bits that provide location, angular orientation and/or time information according to the present invention.

The GPD receiver/processor 517 receives the GPD signals from the GPD antenna 515 and determines the location and/or angular orientation of the GPD antenna (or digital camera) and/or time of receipt/observation of the GPD signals, using the times of arrival of the GPD signals from the different GPD satellite sources 519A, 519B, 519C, 519D and the known locations of these sources at any given time. The GPD satellite sources may belong to the Global Positioning System ("GPS"), to a Global Orbiting Navigational Satellite System ("GLONASS") or to any other suitable geosynchronous or non-geosynchronous satellite system that broadcasts timed signals that can be used to determine location and/or angular orientation and/or time of receipt/observation of a receiver of such signals, such as the Motorola satellite Iridium system or the LEO (low Earth Orbit) satellite system. The GPD signal antenna 515 is actually three or more spaced apart, non-collinear, GPD signal-receiving component antennas 515-1, 515-2, 515-3, shown in FIG. 5, whose distances from each other are known and preferably fixed. In this configuration, a GPD signal received at each of the component antennas 515-1, 515-2, 515-3 from a given satellite source, such as 519B, is received by multiplexing at the GPD receiver/processor 517; and the different times of arrival of this GPD signal at the different component antennas determines the angular orientation of a plane or other geometric object containing these component antennas. The GPD component antennas 515-1, 5152, 515-3 may be rigidly attached to the digital camera 513. Alternatively, one or more of these GPD component antennas 515-2 and/or 515-3 may be snappable into place at fixed angles and at fixed distances relative to another component antenna 515-1, whose location on the digital camera 513 is fixed. The user 511 points or orients the digital camera 513 and records a digital image of a selected view, as indicated in FIG. 3. At the time this image is recorded, the GPD antenna 515 and GPD receiver/processor receive and analyze GPD signals and determine the present location and/or angular orientation and/or time of receipt/observation of the GPD signals, referred to collectively as "position information" for convenient reference. In a first embodiment of the invention, the position information is automatically recorded separately at the time the digital image of the selected view is recorded, and the digital image and the position information are associated or bound together for future use. For example, the digital image may be recorded in sub-frame N-I and the position information may be recorded in a contiguous sub-frame N-2 (of smaller size), which are both parts of frame N. Sub-frame N-2 is illustrated in FIG. 6 as a linear bit array BA of bits, including an optional header having H 1 bits, B I bits containing the location coordinates or related location information for the digital camera, B2 bits containing the angular orientation coordinates or related orientation information for the digital camera, B3 bits containing time of receipt/observation information for the digital camera, and an optional trailer containing H2 bits. The numbers Hi, B I, B2, B3 and HI are non-negative integers, and at least one of the integers B 1, B2 and B3 is positive. In FIG. 6, B1 or B2 or B3 is a positive integer only if the corresponding position information item (location, orientation or time) is recorded and included in the bit array BA. If location information is recorded, for example, each of the two or three location coordinates, Xu, Yu and/or zu, might be allocated 16 or more bits in the bit array BA to express the corresponding location coordinate in the location coordinate system chosen (Cartesian, polar, cylindrical, spherical, ellipsoidal, etc.) for such representation. If angular orientation information is recorded, each of the one or two angular coordinates $\phi$ and/or $\theta$ might be allocated 16 or more bits in the bit array BA, If time information is recorded, this information might be allocated 16 or more bits in the bit array BA.

In a second embodiment of the image authenticating version of the present invention, the position information is automatically recorded or embedded as part of the corresponding digitally expressed linage formed by the digital camera, using the bit array A shown in FIG. 6. Here, a pattern P of pixels is chosen in the digital image. For each pixel in the pattern P, one or more bits in the representation of the pixel value is replaced by a bit in the bit array BA, and the original digital image is reformed as a modified digital image, now containing the position information recorded at the time the original digital image was formed. It is the modified digital image that is stored in the digital camera. The pixel value corresponding to the original digital image may be: (1) a binary value (one bit, black or white, used for text and for line drawings and line graphical images); (2) a gray scale value (J bits with J$\geq$2, used to represent gray scale images with black, white and up to $2^J-2$ gray scales lying between black and white); (3) color values (J bits with J$\geq$8, used to represent R, G, B or C, Y, M, K or some other suitable expression of up to $2^J$ colors in a spectrum, including black and white); and (4) any other suitable pixel value representation.

Figure 7:
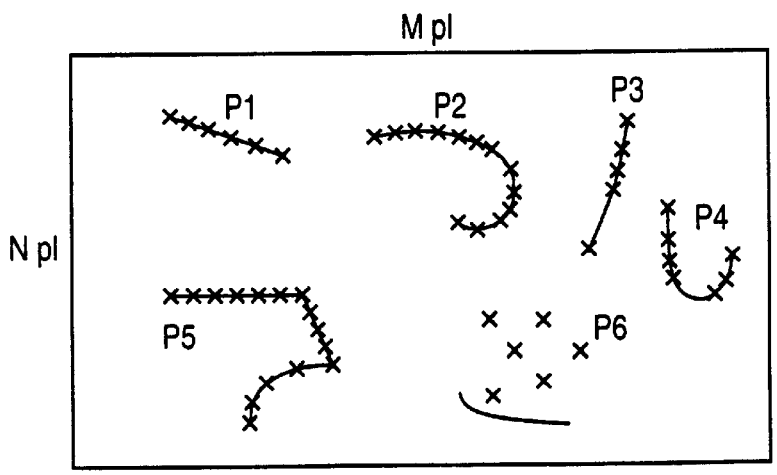
FIG. 7 illustrates several possible pixel patterns that can be chosen for storage of position information to be used for authentication of the digital image, according to one embodiment of the present invention.
Figure 8:
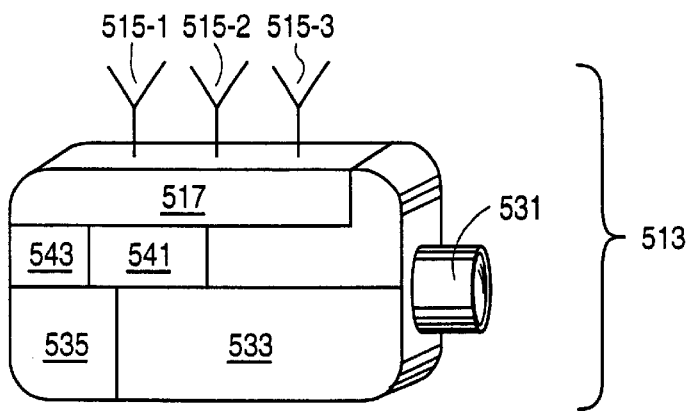
FIG. 8 is a schematic view of the digitized image forming apparatus, GPD signal antenna and receiver/processor apparatus included in one embodiment of the present invention.

FIG. 7 illustrates several possible pixel patterns P that may be chosen here but is not intended to exhaust the possibilities. Possible patterns include a linear contiguous pattern PI of pixels, a curvilinear contiguous pattern P2 of pixels, a pattern P3 of non-contiguous pixels located on a line, a geometric pattern P4 of non-contiguous pixels located on a curve, a geometric pattern P5 of non-contiguous pixels located along an open or closed linear or curvilinear polygon, and a randomly selected pattern P6 of pixels.

The pattern P6 may be selected by reference to, or using, the position information recorded with the digital image. As one example of this selection, if the pixels in the digital representation form an M×N array, assign a distinct number m=0, 1, 2, . . . , M*N−I to each pixel in the pixel array PA. Now express the recorded position information, not as a bit array a shown in FIG. 6, but as a more familiar decimal array of "decimal integers" (each being 0, 1, 2, 3, 4, 5, 6, 7, 8 or 9, a decimal point, or a sign bit ±I). In this decimal array, each of the location coordinates xu, yu and/or zu is allocated Q+1 decimal integers, each of the angular coordinates φ is allocated R decimal integers, and the time information is allocated S decimal integers, where Q, R and S are non-negative integers. Assume that the location coordinates xu, yu and zu are expressed as $(\epsilon_x, d_{x,1}, d_{x,2}, \ldots d_{x,Q})$, $(\epsilon_y, d_{y,1}, d_{y,2}, \ldots, d_{y,Q})$ and $(\epsilon_z, d_{z,1}, d_{z,2}, \ldots d_{z,Q})$, respectively, where $\epsilon_x$ has the value +1 or −1, corresponding to the sign of the coordinate $X_u$ and each of the quantities $d_{x,n}$ (n=1, 2, . . . , Q) is a decimal integer. The pixel pattern P is then chosen as follows, Beginning with the pixel numbered m=m0=1, if $\epsilon_x$=+1, or with the pixel numbered m=mO=1, if if $\epsilon_x$=−1, in the pixel array PA, the first Q pixels in the pattern P correspond to the pixel array numbers $mO+2_{dx,1}$, $mO+2_{dx,1}+2_{dx,2}, \ldots, mO+2_{dx,1}+2_{dx,2}+ \ldots +2_{dx,Q}$=mO'. This encodes the location coordinates $x_u$. Beginning with the pixel numbered m1=mO', if $\epsilon_y$=+1, and with the pixel numbered m1=mO'+1, If $\epsilon_y$=−1, the next Q pixels in the pattern P correspond to the pixel array numbers $m1+2_{dy,1}$, $m1+2_{dy,1}+2_{dy,2}, \ldots m1+2_{dy,1}+2_{dy,2}+ \ldots +2_{dy,Q}$=m1'. This encodes the location coordinates $y_u$. This selection of pixel locations continues with the Q pixel locations corresponding to the location coordinate $z_u$, the R pixel locations corresponding to the angular coordinate φ, the R pixel locations corresponding to the angular coordinate θ, and the S pixel locations corresponding to the time information.

The set of pixel locations in the pattern P is a maximum of 3Q+2R+S, although fewer pixel locations can be used if desired. This set of (at most) 3Q+2R+S pixel locations can be augmented by additional pixel locations selected using information in addition to the position information. Alternatively, the set of pixel locations in the pattern P used to record the position information can be generated according to some other selection procedure, including a purely random pixel selection procedure. Once the pixel pattern P is selected, one or more bits in the pixel value representation for each pixel in the pattern P is replaced by a bit from the ordered bit array BA (FIG. 6) that represents the position information, In one preferred mode of this second embodiment, the least significant bit ("LSB") of each of the pixel value representations for pixels in the pattern P is replaced by a bit in the bit array BA. Where gray scale or color representations of an image are used with N≧8 bits, change of the LSB from 1, or from I to 0, will not be detectable by most persons so that after such LSB replacement the modified digital image (in visually perceptible form) will be substantially the same as the original digital image.

In a second mode of this second embodiment, two or more bits in a pixel value representation, for one or more pixels in the pattern P, are replaced by bits from the bit array BA of position information. With this last mode implemented, the modified visually perceptible image may be substantially different from the original image and may have a "salt and pepper" visual appearance wherever the number of pixels in the pattern P in a region of the pixel array PA is large.

In either the first or second embodiment, the position information, shown in bit array format in FIG. 6, can be presented in cleartext or can be encrypted, using an encryption algorithm with a selected encryption key and a corresponding decryption key, The selected encryption key can be prescribed independently of the content of the position information.

Alternatively, the encryption key can depend upon the content of the position information. In this alternative approach, a selected part, or all of, the position information is treated as one or more parameters that determine the encryption key. For example, the location information and/or angular orientation information and/or time information can be expressed in bit array format and can be combined, bit by bit, with a selected bit pattern of appropriate length L, using EXclusive Or or EXclusive NOR or twos complement addition, to form an encrypted bit array $BA_{enc}$. The encrypted bit array $BA_{enc}$ is then placed in the second sub-frame associated with the digital image in the first sub-frame (first embodiment) or is used to replace selected bits in the pixel value representation for the pixels in a pixel pattern P, such as shown in FIG. 7.

Any of the known encryption techniques discussed above may also be used, such as the DES, RSA, public key, and the like. The security of the authentication depends, as in any security system, on the integrity of the individual in possession of the encryption and decryption key. Presumably, this is an officer or officers of the court in the case of civil and criminal law.

Figure 9:
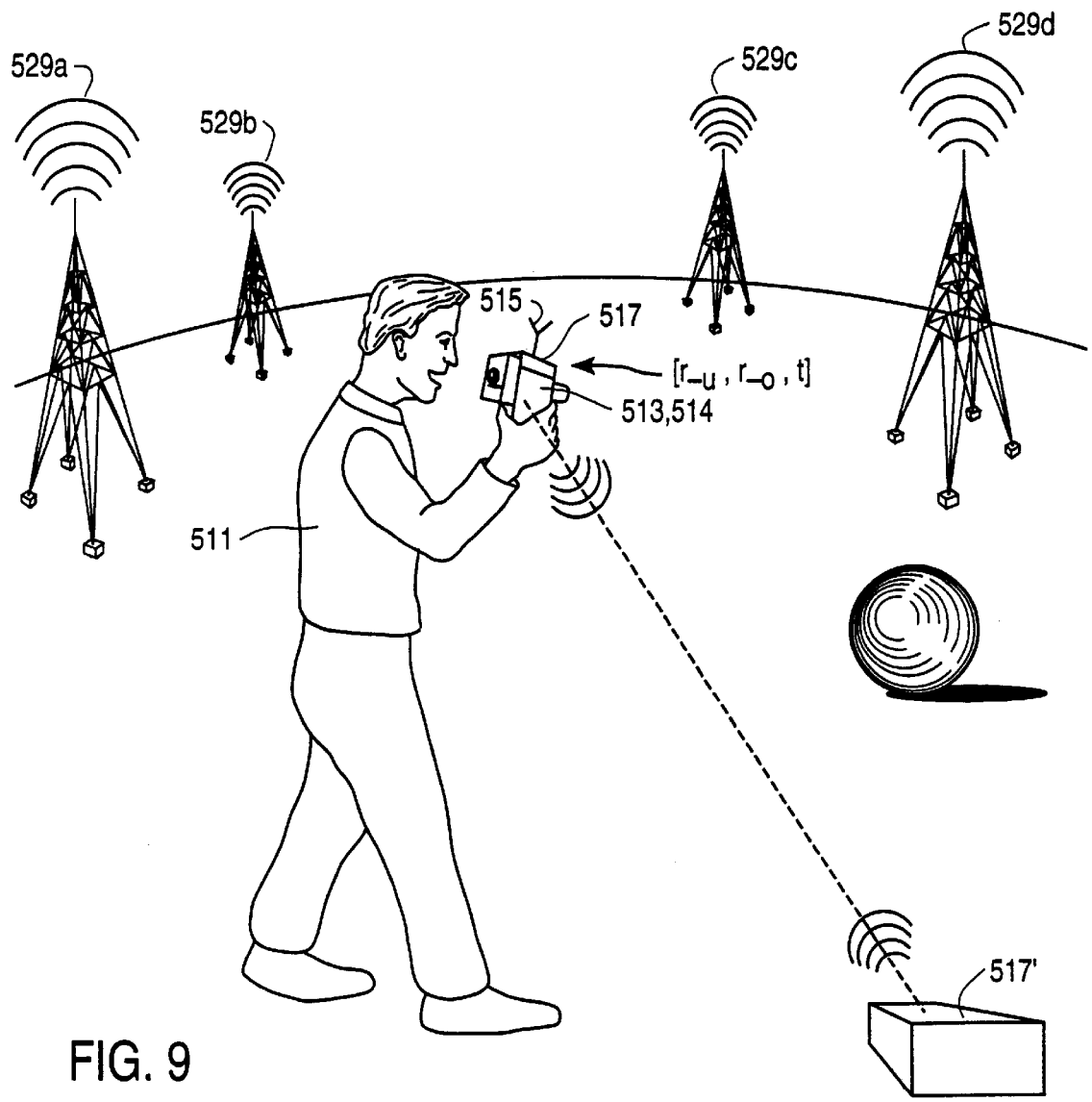
FIG. 9 illustrates use of one embodiment of the invention in an environment where the location, angular orientation and/or time information for the GPD is provided by ground-based sources of GPD signals.

One advantage of this system, is the ease of transporting a compact key separately from the equipment and recording media which store the recorded image and audio data. Multiple copies may be made of the encrypted data to be provided to various parties, with absolute assurance that only the party with the key can access the data until all parties bring their respective copies together for comparison Optionally, once the digital image is formed, this image may be "frozen" within the digital camera so that this frozen image and the associated authentication information cannot be deleted or altered in any way but can be displayed visually or downloaded and processed by an authorized downloader, to exhibit the digital image and the authentication information. The digital image and authentication information is never transmitted to another person or facility and thus is not interceptible or vulnerable to deletion or alteration by a person or facility with an incentive to make such deletion,; or alterations. The digital image and the associated position information is downloaded directly from the digital camera, possibly using, a portion of or all of the position information to provide a key for decryption and/or to provide a key for determining the pattern P of pixels used to hold the position information, Authentication of the image is provided by comparing the position information contained in or associated with the digital image data with the putative position information that is asserted or is on file elsewhere. Alternatively, the GPD signal antenna 515 and GPD signal receiver/processor 517 can receive GPD signals from ground-based GPD signal sources, such as signal towers or other substantially stationary sources 529A, 529B, 529C, 529D in a Loran-C, Tacan, Decca, Omega or Metricom system, as illustrated in FIG. 9.

Substantially the same technique may be used for steganographically encrypting authentification position data into the data bits of a captured digital audio file. With reference to FIG. 10, each one of a sequence of the authentication data bits (not shown) derived from the position and/or time data bits may be encrypted into the least significant bits 552 of one of an algorithmically derived steganographic subset of digital audo sample data portions 554 of a set of digital audio subframes 556. Again, any of the known encryption techniques could be used, such as DES, RSA, substitution, one time pad and the like, depending on the degree of security desired and the cost limitations.

Data formats for digital audio tape, digital disk, CD ROM and optical disc are outlined on pages 19-85 to 19-94 of the "*Electronics Engineers Handbook*", Donald G. Fink, Donald Christiansen, 3rd Edition, McGraw Hill, New York, N.Y., 1989. Details may be obtained from the references contained in the bibliography on pages 19-95 to 19-98, op cit The entity entrusted with the secret encrypting key, may record audio data and encrypt the position and/or time data within the audio data file. Subsequent play back of the audio data may be authenticated by decrypting the audio data with a corresponding decryption means using the corresponding decryption key associated with the subject audio data. Geo-addressed audio data apparatus and methods are discussed in a concurrently filed patent application "Integrated Audio Recording and GPS System" by Arthur N. Woo, filed on even date herewith.

Another embodiment of the present geographical position/image digital recording and display system is illustrated with reference to FIG. 11 and indicated by the numeral 600. A recording unit 602 includes a geographical position detector (GPD) 610, such as a Global Positioning Service (GPS) device.

The GPD 610 is capable of providing digital position data (eg. latitude, longitude, height, azimuth, elevation angle, roll, range and the like) to a geographic digital position data recorder (GPDR) 630, such as a magnetic storage device (such as a disk drive or tape drive system), a dynamic or static RAM (SRAM or DRAM) a semiconductor flash memory, a write-once-read-many (WORM) memory and the like.

An object image 650 is captured by means of an bi-directional fish eye optical system (FOPS) 660 which provides digital image data 670 to a digital audio/image recording device (IRD) 680. The FOPS optical system 660 includes two oppositely facing hemispherical fisheye lenses 661$a$ and 661$b$, arranged to cover substantially all of the 2Pi stereradian solid angle surrounding the lens 660 (except for the solid angle obscured by a connecting post 664 and the body of the system 600). Such fisheye lenses are well known in the photographic arts. The FOPS lens is coupled to a lens and focusing mechanism (not shown) which transmits the object image to an imager, eg, a photosensitive array such as an array of light sensitive CCD cells or photodiodes (not shown). Each imager element cell produces an analog image pixel output signal representative of the intensity and color of the light from one pixel of the object image 650. The analog output signal may be translated into a digital image signal by conventional analog to digital conversion techniques, representing the intensity data and color data for each image pixel. The digital image signals from all the array cells are combined into a digital frame signal which represents the complete object image data 670.

The digital object image data 670 is processed and stored in the recording device 680, for example, as a sequential digital image data file, If.

An audio pickup device 672 is provided for receiving audio at essentially the same time the object image 650 is being recorded. The device 672 provides digital audio data 674 to the recording device 680 for recording and storage as a digital audio data file, Af, along with the object image data 670. The audio device 672 may be a microphone aimed at the object 650 to pick up sounds produced by the object or may be used to provide voice over commentary by the user of the system 600.

The recording unit 602 also includes a recording controller 681 which is provided with suitable control and data connections (not shown) to and from the GPD 610, the GPDR 630, the optical system 660, the audio pickup device 672 and the audio/image recording device 680 for controlling the sequence and timing of the capture and recording of the system 600 position at the time of capture and recording of the object image 650 and audio data Af. Means may also be provided for recording the time, Ti, of the capture of the image 650 as image data, If, which is associated with the geographical location, $L_i$, determined at the time, Ti, therewith. The digital object image data 670, and the digital audio data 674 is automatically geo-addressed to the position where the image was captured. The digital object image data 670 and digital audio data 674 thus may be displayed with reference to a geo-addressed map during later playback as described with reference to FIG. 1 supra.

The system 600 may incorporate any of the features of the present invention described above with reference to FIGS. 1 and 2.

While the foregoing detailed description has described the embodiments of the geographical position/image digital recording and display system in accordance with this invention, it is to be understood that the above description is illustrative only and not limiting of the disclosed invention. It will be appreciated that it would be possible to modify the size, shape and appearance and methods of manufacture of various elements of the invention or to include or exclude various elements within the scope and spirit of this invention. Thus the invention is to be limited only by the claims as set forth below.

What is claimed is:

1. A geo-addressed image recording, playing and storage system, comprising:
    an optical system having an imager capturing an object image and outputting the object image as digital image data;
    a digital data recorder receiving and storing the digital image data;
    a position detector receiving location determination signals from a plurality of location determination signal sources, the position detector generating position information responsive to the location determination signals;
    a processing unit relating the stored digital image data and the position information, the processing unit encrypting the position information using an encryption key comprising at least a portion of the position information, the processing unit decrypting the encrypted position information using the encryption key; and
    a viewer communicating with a geo-addressed map data base, the stored digital image data, and the position information, the viewer selectably viewing a portion of the stored digital image data in relation to a geo-addressed map and the decrypted position information.

2. The geo-addressed image recording playing and storage system of claim 1 wherein the position information comprises location information, angular orientation information and time of receipt information.

3. The geo-addressed image recording playing and storage system of claim 1 wherein the digital image data and the position information are stored as a multi-media data file.

4. The geo-addressed image recording playing and storage system of claim 1 wherein the encryption key is stored separate from the digital data recorder.

5. The geo-addressed image recording playing and storage system of claim 1 further comprising a controller creating a modified viewing image from the digital image data, the geo-addressed map and the position information.

6. The geo-addressed image recording playing and storage system of claim 1 further comprising:
- an audio pickup device outputting digital audio data during capture of the object image, the digital audio data stored in the digital data recorder;
- the processing unit relating the stored digital audio data, the position information and the digital image data; and
- a transducer reproducing the stored digital audio data in relation to the decrypted position information.

7. The geo-addressed image recording playing and storage system of claim 1 wherein the digital image data, the digital audio data and the position information are stored as a multi-media data file.

8. The geo-addressed image recording playing and storage system of claim 1 wherein the digital image data, the position information and the geo-addressed map data base are stored in a signal data file in the digital data recorder.

9. The geo-addressed image recording playing and storage system of claim 1 wherein the digital image data is a graphical image.

10. The geo-addressed image recording playing and storage system of claim 1 wherein the digital image data is a video image.

11. The geo-addressed image recording playing and storage system of claim 1 wherein the digital image data is a still photo image.

12. The geo-addressed image recording playing and storage system of claim 1 wherein the digital image data, the geo-addressed map and the position information are related by hyper-media links.

13. The geo-addressed image recording playing and storage system of claim 1 further comprising an attitude sensor determining an attitude of the imager during capture of the object image, the digital data recorder storing the attitude of the imager during capture of the object image as attitude data, the processor relating the stored digital image data and the stored attitude data.

14. The geo-addressed image recording playing and storage system of claim 1 wherein the object image is one of a plurality of multiple sequential object images captured at a frame rate, the plurality of object images stored as the digital image data by the digital data recorder, the viewer selectably viewing the plurality of multiple sequential object images at the frame rate.

15. The geo-addressed image recording playing and storage system of claim 14 wherein the frame rate is selectable.

16. The geo-addressed image recording playing and storage system of claim 14 wherein the frame rate is fixed.

17. The geo-addressed image recording playing and storage system of claim 14 wherein the frame rate is variable.

18. The geo-addressed image recording playing and storage system of claim 1 wherein the digital image data is authenticated responsive to the encrypted position data being decrypted using the encryption key.

* * * * *